United States Patent [19]

Huang et al.

[11] Patent Number: 5,284,584
[45] Date of Patent: Feb. 8, 1994

[54] HOLLOW FIBER MEMBRANE FABRIC - CONTAINING CARTRIDGES AND MODULES HAVING SOLVENT-RESISTANT THERMOPLASTIC TUBE SHEETS, AND METHODS FOR MAKING THE SAME

[75] Inventors: Xiaoyan Huang, Charlotte, N.C.; J. Clift Delozier, Fort Mill, S.C.; Ravi Prasad; Charles J. Runkle, both of Charlotte, N.C.; Harry F. Shuey, San Dimas, Calif.

[73] Assignee: Hoechst Celanese Corporation, Somerville, N.J.

[21] Appl. No.: 999,054

[22] Filed: Dec. 31, 1992

[51] Int. Cl.$^5$ .......................................... B32B 31/02
[52] U.S. Cl. ............................ 210/321.61; 156/184; 156/185; 156/187; 156/191; 156/192; 156/244.11; 156/244.13; 156/244.24; 210/321.78; 210/321.79; 210/321.85; 210/321.87
[58] Field of Search ................. 156/244.11, 244.24, 156/184, 185, 187, 191, 192, 244.13; 210/321.61, 321.78, 321.79, 321.85, 321.87

[56] References Cited

U.S. PATENT DOCUMENTS

| Re. 31,389 | 9/1983 | Brauer et al. |
|---|---|---|
| 2,663,660 | 12/1953 | Layte . |
| 3,228,877 | 1/1966 | Mahon . |
| 3,339,341 | 9/1967 | Maxwell et al. . |
| 3,422,008 | 1/1969 | McLain . |
| 3,428,591 | 2/1969 | Lewis . |
| 3,440,194 | 4/1969 | Taranto . |
| 3,442,002 | 5/1969 | Geary et al. . |
| 3,557,962 | 1/1971 | Kohl . |
| 3,619,459 | 11/1971 | Schrader . |
| 3,703,962 | 11/1972 | Schrader . |
| 3,722,695 | 3/1973 | Sargent et al. . |
| 3,728,425 | 4/1973 | Schrader . |
| 3,755,034 | 8/1973 | Mahon et al. . |
| 3,769,128 | 10/1973 | Manjikian . |
| 3,872,014 | 3/1975 | Schell . |
| 3,962,094 | 6/1976 | Davis et al. . |
| 4,033,878 | 7/1977 | Foreman et al. . |
| 4,061,574 | 12/1977 | Clark . |

(List continued on next page.)

FOREIGN PATENT DOCUMENTS 0093677  11/1983  European Pat. Off. .
233946  3/1986  Fed. Rep. of Germany .

OTHER PUBLICATIONS

Transport Phenomena, R. Bird et al, Wiley & Sons, New York, p. 46.
ASTM Method D 1238-85, pp. 555-565.
ASTM Designation D 1525-91, "Standard Test Method for Vicat Softening Temperature of Plastics" (see specification, pp. 25, 37).
"Whelan et al, *The Dynisco Extrusion Processors Handbook*, p. 34 (1988)" see specification, p. 25).
"Hostalen ® and Hostalen PP ®, Resistance to Chemical and Other Media", Hoechst Plastics, May 1987 (see specification, p. 39).
"Chemical Resistance of Plastic Molding Materials", Dow Chemical Co., Plastics Dept., 1968 (see specification, p. 39).
Japan published application no. 3242229, dated Oct. 29, 1991 (English Abstract only).
Japan published application no. 3221128, dated Sep. 30, 1991 (English Abstract only).
Japan published application no. 4200728, dated Jul. 21, 1992 (English Abstract only).

*Primary Examiner*—Caleb Weston
*Attorney, Agent, or Firm*—Jay M. Brown

[57] ABSTRACT

This invention provides spiral-wound hollow fiber membrane fabric-containing cartridges and modules for separations and other phase contact applications, including tube sheets having improved solvent resistance and mechanical durability which are fabricated by extrusion of thermoplastic resins having particular defined characteristics, and methods for making the same.

17 Claims, 4 Drawing Sheets

U.S. PATENT DOCUMENTS

| | | | |
|---|---|---|---|
| 4,138,303 | 2/1979 | Taylor, Sr. . | |
| 4,138,460 | 2/1979 | Tigner . | |
| 4,207,192 | 6/1980 | Coplan et al. . | |
| 4,211,597 | 7/1980 | Lipps et al. . | |
| 4,231,871 | 11/1980 | Lipps et al. . | |
| 4,290,987 | 9/1981 | Soehngen et al. . | |
| 4,293,418 | 10/1981 | Fujii et al. . | |
| 4,323,453 | 4/1982 | Zampini . | |
| 4,323,454 | 4/1982 | Fritzsche et al. . | |
| 4,343,668 | 8/1982 | Francisoud et al. . | |
| 4,367,139 | 1/1983 | Graham . | |
| 4,369,605 | 1/1983 | Opersteny et al. . | |
| 4,405,688 | 9/1983 | Lowery et al. . | |
| 4,430,219 | 2/1984 | Kuzumoto et al. . | |
| 4,460,641 | 7/1984 | Barer et al. . | |
| 4,464,494 | 9/1984 | King et al. . | |
| 4,541,981 | 9/1985 | Lowery et al. . | |
| 4,623,460 | 11/1986 | Kuzumoto et al. . | |
| 4,686,039 | 8/1987 | Otstot et al. . | |
| 4,758,341 | 7/1988 | Banner . | |
| 4,770,778 | 9/1988 | Yokoyama et al. . | |
| 4,781,834 | 11/1988 | Sekino et al. . | |
| 4,842,736 | 6/1989 | Bray et al. . | |
| 4,855,058 | 8/1989 | Holland et al. . | |
| 4,865,735 | 9/1989 | Chu et al. . | |
| 4,906,371 | 3/1990 | Miller . | |
| 4,911,846 | 3/1990 | Akasu et al. . | |
| 4,929,259 | 5/1990 | Caskey et al. . | |
| 4,940,617 | 7/1990 | Baurmeister . | |
| 4,959,152 | 9/1990 | Nichols | 210/321.29 |
| 4,961,760 | 10/1990 | Caskey et al. . | |
| 4,980,060 | 12/1990 | Muto et al. . | |
| 4,997,564 | 3/1991 | Herczeg . | |
| 5,002,666 | 3/1991 | Matsumoto et al. | 210/321.61 |
| 5,013,437 | 5/1991 | Trimmer et al. . | |
| 5,013,439 | 5/1991 | Fisher et al. . | |
| 5,026,479 | 6/1991 | Bikson et al. . | |
| 5,034,126 | 7/1991 | Reddy et al. . | |
| 5,059,374 | 10/1991 | Krueger et al. . | |
| 5,066,397 | 11/1991 | Muto et al. . | |
| 5,114,582 | 5/1992 | D'Urso . | |
| 5,141,031 | 8/1992 | Baurmeister | 210/321.79 |
| 5,143,312 | 9/1992 | Braurmeister . | |
| 5,158,581 | 10/1992 | Coplan . | |
| 5,186,852 | 2/1993 | Mancusi et al. . | |

HOLLOW FIBER MEMBRANE FABRIC-CONTAINING CARTRIDGES AND MODULES HAVING SOLVENT-RESISTANT THERMOPLASTIC TUBE SHEETS, AND METHODS FOR MAKING THE SAME

BACKGROUND

This invention relates to the field of spiral-type hollow fiber membrane fabric-containing cartridges and modules for separations and other phase contact applications. In particular, this invention relates to an improved cartridge or module having tube sheets which are fabricated from solvent-resistant thermoplastic resins. The teachings of this invention can, if desired, be used in conjunction with the subject matter of applicant's copending U.S. Pat. application Ser. No.: 07/816,511 entitled, "Spiral-Wound Hollow Fiber Membrane Fabric Cartridges and Modules Having Flow-Directing Baffles"; and copending U.S. Pat. application Ser. No.: 07/917,690 entitled, "Spiral-Wound Hollow Fiber Membrane Fabric Cartridges and Modules Having Integral Turbulence Promoters", which are both hereby incorporated by reference in their entirety.

There is a great deal of prior art relating to the structure, fabrication and use of spiral-type hollow fiber-containing cartridges. Among the early disclosures of such devices are Mahon U.S. Pat. No. 3,228,877 and McLain U.S. Pat. No. 3,422,008, both of which are incorporated herein by reference in their entirety. In general, a bundle of hollow fibers is positioned around and parallel to the longitudinal axis of a rod-shaped core (which may be a hollow mandrel and may or may not be removed after the bundle is fabricated), the ends of the hollow fiber bundle are potted in tube sheets, and the cartridge is fitted into a pressure housing suitably ported to facilitate feed, permeate and concentrate flows, to constitute a complete module.

More recently, the art has improved such cartridges by forming the hollow fibers into a fabric-like web in which the hollow fibers, parallel to the core axis, are held in place relative to each other by transverse filaments which may or may not also be hollow fibers. The development of these hollow fiber membrane fabrics was an important step in the evolution of this technology, because the fabric both makes unnecessary the manual handling of a random bundle of loose hollow fibers, and facilitates the construction of spiral-wound modules having the hollow fibers spaced and oriented in a highly regular fashion.

Despite these developments, the challenge to optimize the operability, efficiency and durability of these hollow fiber-containing cartridges has continued. With the development of hollow fiber membrane fabrics, the limiting factor in building a module becomes the fabrication of the tube sheets. The classic hollow fiber potting processes include gravity potting and centrifugal potting. In gravity potting, a resinous potting material is introduced into each of the bundle ends, one at a time, and allowed to settle into the end of the bundle and cure. In centrifugal potting, the bundle is inserted into the housing, the assembly is spun on its midpoint to create centrifugal force at both bundle ends, resinous potting material is introduced into the shell-side space near both bundle ends, and the resinous potting material is allowed to cure. (See generally, Mahon U.S. Pat. No. 3,228,877; Maxwell et al U.S. Pat. No. 3,339,341; Geary et al U.S. Pat. No. 3,442,002; Davis et al U.S. Pat. No. 3,962,094; Opersteny et al U.S. Pat. No. 4,369,605; and Chu et al U.S. Pat. No. 4,865,735). Among the many drawbacks of these procedures are the following: (1) these are labor-intensive manual processes; (2) being manual processes, these procedures do not yield modules of uniformly high quality; (3) the potting resins tend to wick along the dry portions of the hollow fibers, especially in the dipping process; (4) the potting resins must have a sufficiently low viscosity to readily flow among the closely spaced hollow fibers and wet all adjacent hollow fiber surfaces, especially in the case of the centrifugal process; (5) the inherent requirement in these procedures that the potting resin must readily flow among the hollow fibers limits the acceptable potting resins in terms of both solvent resistance and mechanical durability after cure; (6) whenever the curing reaction in the potting resin is exothermic, heat buildup within the tube sheet area, particularly the center of the tube sheet, can lead to catastrophic meltdown of the adjacent hollow fiber ends, markedly reducing the operative portion of the bundle or even rendering the module useless (attempts to conventionally pot a cartridge having a diameter greater than about four inches will so fail, unless a resin such as an epoxy or polyurethane resin having low solvent resistance, or a resin including fillers (to conduct heat and/or act as a diluent, reducing the proportion of the total potting resin composition which must undergo exothermic cure), is used; the low exotherm in curing such a resin results in poor curing quality and accordingly poor solvent resistance and/or mechanical properties); (7) gaps or air bubbles in the potting resin due to inadequate flow may cause leaks in the cartridge; (8) the materials conventionally used as potting resins and having good solvent resistance tend to be brittle (e.g., low molecular weight polyethylene); (9) the materials conventionally used as potting resins and being rubbery tend to have poor solvent resistance (e.g., polyurethane); and (10) both the centrifugal and gravity potting techniques necessitate at least one shell-side port on the side of the module housing, into which the potting resin is poured. If such ports are to be used in later module operation, multiple modules cannot be connected in series without exterior piping or specially-designed pressure housings.

Poor tube sheet solvent resistance and mechanical durability can have great impact on the performance features of the resulting modules. The feasible operating environments of the hollow fiber-fabric —containing cartridges and modules ideally would include all types of solvents. No hollow fiber—forming material is inert to all solvents, but conventionally-available hollow-fiber spinning technology does make available a wide range of hollow fiber types. Assuming that one has chosen an appropriate type of hollow fiber for a particular application or range of applications, and formed a fabric from the hollow fibers, poor solvent resistance in the potting resin can result in failure of the cartridge or module, thus limiting the capability of the hollow fibers themselves. Similarly, the purpose of the tube sheets is to isolate the lumen-side and shell-side portions of the cartridge or module from each other. If the tube sheet material cracks or otherwise disintegrates, total failure of the module occurs. Unfortunately, the conventional methods of tube sheet production (centrifugal casting and gravity potting), require a high degree of potting resin flowability, thus limiting the range of usable potting resins in terms of molecular weight, viscosity and other properties and encouraging the development of solvent-induced and mechanical degradation.

Some attempts have been made to overcome one or more of these difficulties by depositing potting material to form tube sheets simultaneously while the hollow fiber bundle is being formed. For example, the Mahon et al U.S. Pat. No. 3,755,034 discloses a process in which (1) two monofilaments are continuously unwound in parallel spaced-apart fashion from spools and onto a mandrel; (2) one or more continuous hollow fibers are continuously unwound transversely across and around the two filaments, forming a planar web of hollow fibers which nearly are mutually parallel and nearly are parallel to the longitudinal axis of the mandrel; (3) the web is wound spirally onto the mandrel; and (4) a band of solidifiable resin is applied adjacent to one or each end of the hollow fibers (near the filament) and subsequently cured to form a resinous tube sheet. Epoxy resins and silicone rubbers are suggested for forming the tube sheets; and the use of hypodermic needles as potting resin dispensing heads is disclosed. The Schrader U.S. Pat. No. 3,728,425 takes a different approach: (1) a single continuous hollow fiber is wound transversely around an elongated cylindrical mandrel core analogously to a bundle of kite string; (2) a band of resin is simultaneously applied at each end of the core, forming tube sheets, and is cured. Polyepoxide resin is disclosed for use, and Schrader employs applicators as shown in FIG. 2 to apply the bands of resin. The Krueger et al U.S. Pat. No. 5,059,374 discloses that the tube sheets may be formed about the ends of a hollow fiber bundle simultaneously with laying down of the fibers, such as by dripping resin along the fibers as the fibers are laid down. Krueger mentions a number of materials that can serve as tube sheet resins, including polyolefins and polyamides. See also, Sargent et al U.S. Pat. No. 3,722,695; Francisoud et al U.S. Pat. No. 4,343,668; applicant's copending U.S. Pat. application Ser. No.: 07/816,511 entitled, "Spiral-Wound Hollow Fiber Membrane Fabric Cartridges and Modules Having Flow-Directing Baffles"; and applicant's copending U.S. Pat. application Ser. No.: 07/917,690 entitled, "Spiral-Wound Hollow Fiber Membrane Fabric Cartridges and Modules Having Integral Turbulence Promoters".

Other prior art disclosures broadly suggesting the use of thermoplastics including polyolefins as tube sheet resins have also been made. For example, the Tigner U.S. Pat. No. 4,138,460 asserts that the choice of material for potting fiber tows to make tube sheets is controlled to a large extent by the viscosity characteristics of the selected material, which should preferably have a viscosity in the range of about 100 to about 5,000 centipoise at a temperature below about 150° C., and is preferably a thermoplastic. Polyethylenes, polypropylenes, and copolymers and mixtures thereof can be used; and reference is made to compositions using low molecular weight polyethylene resins (See a similar disclosure in Lipps et al U.S. Pat. No. 4,211,597 and Lipps et al U.S. Pat. No. 4,231,871, which further note that low viscosity resins tend to completely wet and encapsulate the hollow fibers in shorter times and are therefore preferred). The Brauer et al, U.S. Pat. Reissue No. 31,389 reviews certain materials previously used to fabricate tube sheets, and notes that many of them, including polyolefins and olefin copolymers, have been found deficient in one aspect or another. (See also, Maxwell et al U.S. Pat. No. 3,339,341; Davis et al U.S. Pat. No. 3,962,094; Zampini U.S. Pat. No. 4,323,453; Fritzsche et al U.S. Pat. No. 4,323,454; Otstot et al U.S. Pat. No. 4,686,039; Opersteny et al U.S. Pat. No. 4,369,605; and Chu et al U.S. Pat. No. 4,865,735).

The need continues for improved methods and materials for making tube sheets which will more closely approach the solvent resistance and mechanical durability of the hollow fibers themselves.

SUMMARY OF THE INVENTION

According to the invention, a method of fabricating a spiral-type hollow fiber membrane fabric-containing cartridge is provided, comprising the following steps:

a. forming a plurality of hollow fiber membranes each having a lumen, into a fabric-like array having a warp and a weft, in which the hollow fibers substantially are mutually-parallel and constitute the fabric weft, and are held in spaced-apart relationship by filaments constituting the fabric warp; then b. winding the array upon an axis which is substantially parallel to the hollow fibers into a spirally-wound membrane bundle having two bundle ends and a cylindrical exterior surface; and c. simultaneously with step (b.), extruding in molten form a high-strength, solvent resistant thermoplastic resin having a melting point at least about 10° Centigrade below the melting point of the hollow fibers, and having a melt flow index between about 0.01 to about 150 grams/10 minutes; and directing said resin onto each of the two bundle ends to thereby pot each of the two bundle ends in said resin, serving to seal the bundle end into an adjacent monolithic tube sheet, a portion of the bundle between the two tube sheets being free from resin to form a shell-side region; and then d. exposing the lumen ends of the hollow fibers constituting at least a first one of the bundle ends to communicate with the exterior of the bundle.

The invention also provides improved spiral-type hollow fiber membrane fabric-containing cartridges, prepared by the foregoing method. Further embodiments will be detailed in the discussion below, and defined in the appended claims.

DETAILED DESCRIPTION OF THE INVENTION

Figure 1:
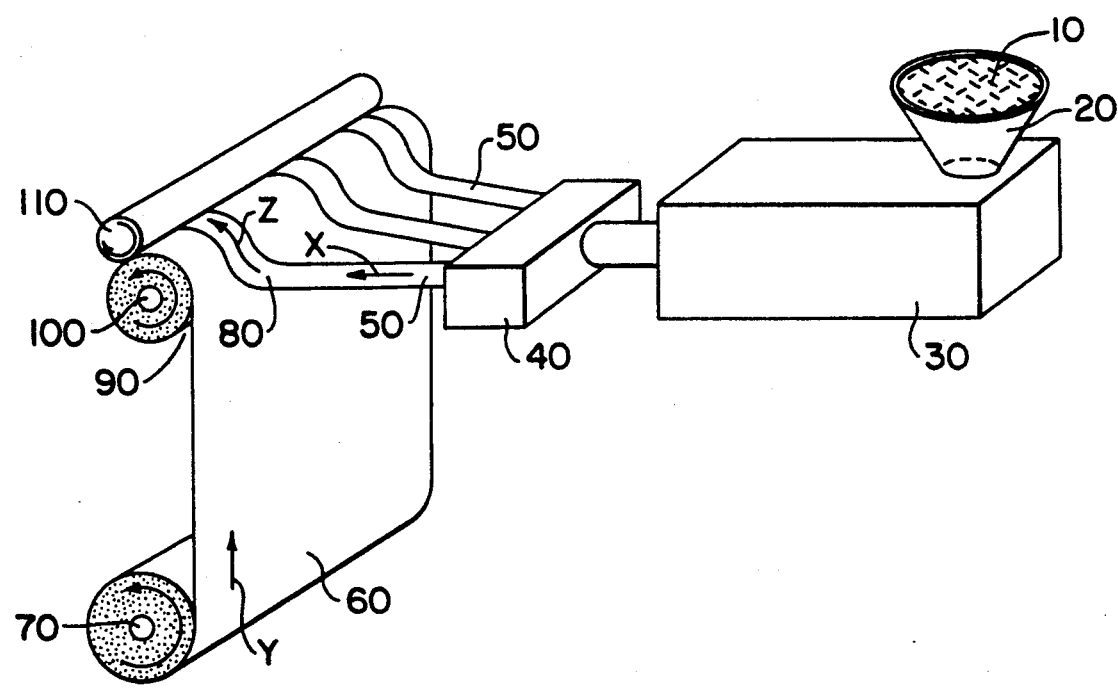
FIG. 1 is a schematic drawing of a method for making a cartridge according to the invention, in which tube sheets are fabricated by extrusion of a solvent resistant thermoplastic resin which is directly applied to each of the bundle ends.

This invention provides improvements in the art of spiral-type hollow fiber membrane fabric-containing cartridges and modules for separations and other phase contact applications. The term "phase contact" is used herein to generally describe any process involving mass transfer.

The improvements provided by this invention primarily reside in the tube sheets in which the hollow fiber membrane fabric is potted. The primary purpose of this invention is to provide improved solvent resistance and mechanical durability in the tube sheets, and to thereby extend the utility and useful life of the overall cartridges and modules. Accordingly, in the practice of this invention, the tube sheets must be fabricated from a high-strength, solvent resistant thermoplastic resin, and the resin must be extruded at an elevated temperature to form a molten band of potting material that is directed onto the surface of the hollow fiber membrane fabric to be potted. In preferred embodiments, the solvent resistant thermoplastic resin is a polyolefin resin. The other components of the cartridges and modules can be fabricated from any suitable conventionally-known materials. Preferably, such other components themselves also demonstrate exceptional solvent resistance and mechanical durability. Most preferably, they are also fabricated from polyolefin materials.

The requirements according to this invention that the tube sheets must be fabricated from a high-strength, solvent resistant thermoplastic resin which is delivered to the hollow fiber membrane fabric by extrusion at an elevated temperature to form a molten band of potting material, yield tube sheets having performance properties dramatically different than those produced by the conventional technology. Among the performance advantages of the tube sheets of the invention (and cartridges and modules containing them) are the following: (1) the process of forming the tube sheets can be automated—the fabric winding and tube sheet resin deposition occur simultaneously and continuously; (2) the automation ensures that the tube sheets will be highly uniform, and the resultant repeatability of the process makes possible its quantitative optimization; (3) the potting resin is a thermoplastic material chosen expressly for its optimum solvent resistance and mechanical durability; (4) the need for the potting resin to have a relatively low viscosity (as with the conventional gravity- and centrifugal-potting methods) can be disregarded; (5) the wicking problem is eliminated; (6) the limitations imposed by exothermic potting resin curing reactions are eliminated, both because there is no exotherm in the thermoplastic resin, and because the progressive buildup of the tube sheets while the outer surface of the nascent tube sheets rotates on the cartridge axis, promotes heat dissipation; (7) the problems resulting from gaps and air bubbles in the potting resin, potentially causing leaks in the cartridge, are eliminated; (8) the tube sheets are neither rubbery nor brittle, but plastic with high tensile- and flexural-modulus and high strength (e.g., the tube sheet polymer has high elongation at break), so the process of trimming the tube sheet ends to expose the lumens is simple, reliable and does not itself damage the hollow fibers; (9) module ports can be configured based on the desired phase contact system design, disregarding the conventional need for means for delivering potting resin to the bundle ends; (10) since resin curing is immediately complete upon cooling as the tube sheet is fabricated, there is no need to allow hours or even days for the curing process, resulting in increased productivity; and (11) according to preferred embodiments in which polyolefin resins are used, these materials are virtually inert, resulting in substantial reductions in the handling dangers and ultimate toxicity attending conventional resins such as polyepoxides and polyurethanes. The elimination of the problems resulting from gravity- or centrifugal- potting with exothermically-curing potting resins yields a special advantage: according to the invention, cartridges of any desired diameter can be uniformly potted in high quality tube sheets. The size of the resulting cartridges is limited only by the width of the hollow fiber membrane fabric and the physical size of the cartridge-winding means. For example, given a hollow fiber membrane fabric formed of 12 - foot long hollow fibers, a module 12 feet long and 6 feet in diameter could be made. Such a module would be large enough to handle industrial-scale phase contact fluid processing needs.

We will now treat the various components of the cartridges and modules in order, along with their means of assembly. This discussion will first make reference to the conventional technology for the materials, fabrication and operation of generally conventional devices, and then return to the improvements according to this invention. Although we assume the reader's understanding of the conventional technology, further reference can be made to the specific Examples and related FIGS. 1-6 below.

The hollow fibers suitable for use in the invention generally include all such materials which can be formed into spiral-type membrane-containing cartridges for separations and other phase contact applications. These hollow fibers may, for example, be microporous, foraminous, or allow diffusion transfer. Hollow fibers of relatively large diameter (sometimes referred to as "tubular membranes") can also be used provided that they have sufficient structural strength to maintain their shape in the bundle. Suitable hollow fibers, described by dimensions and other structural features, and including processes for such manufacture, are disclosed, for example, in the following U.S. patents which are hereby incorporated by reference in their entirety: Fujii U.S. Pat. No. 4,293,418; Kuzumoto U.S. Pat. No. 4,430,219; Banner U.S. Pat. No. 4,758,341; Sekino U.S. Pat. No. 4,781,834; Akasu U.S. Pat. No. 4,911,846; Caskey U.S. Pat. No. 4,961,760; and Bikson U.S. Pat. No. 5,026,479. The hollow fibers can be fabricated from any material demonstrating acceptable solvent resistance and mechanical durability. Preferably, the hollow fibers are made from a thermoplastic resin. More preferably, they are made from the same thermoplastic resin as is selected as the solvent resistant thermoplastic resin for potting the hollow fiber membrane fabric. Most preferably, the hollow fibers are made from polyolefins. The hollow fibers must be adequately capable of being wet by contact with the chosen solvent resistant thermoplastic potting resin. Polyolefin hollow fibers which are hydrophobic and demonstrate desirable solvent resistance and mechanical durability, and means for fabricating the same, are disclosed in Soehngen et al U.S. Pat. No. 4,290,987; Lowery et al U.S. Pat. No. 4,405,688; Lowery et al U.S. Pat. No. 4,541,981; and Fisher et al U.S. Pat. No. 5,013,439, all of which are hereby incorporated by reference in their entirety. It should be noted that the solvent resistance of crystallizable polymers such as polyolefin materials increases along with increasing crystallinity. Accordingly, steps that can be conventionally undertaken to increase the crystallinity of such hollow fibers (for example, annealing) will increase the solvent resistance of the hollow fibers.

The selected hollow fibers are then fabricated into a fabric-like array for assembly into the cartridge. Generally, the principal benefit of incorporating the hollow fibers into a fabric-like array rather than using loose fibers is that the fabric structure holds adjacent hollow fibers in a spaced-apart, mutually parallel relationship. This configuration promotes regularity of the bundle and resultant uniformity in fluid flow dynamics. In preferred embodiments, the hollow fibers constitute the weft of a fabric, e.g., are placed transversely between warp filaments by the guide elements of a loom. Given that the hollow fibers constituting the fabric weft must be held in place by warp filaments, such warp can take any form as taught in the art for fabric-like hollow fiber arrays for spiral bundle production. For example, the warp filaments can themselves be solid or also be hollow fibers, and the fabric construction can be selected from the variety taught by the art. The fabric can, alternatively, be prepared by substituting warp for weft and weft for warp, so that the hollow fibers, constituting the warp, are held by weft filaments. Hence, the terms "warp" and "weft" are used interchangeably hereinafter, and merely designate two groups of filaments or fibers which are oriented transversely to one another to yield a fabric-like web. The weft fibers can be fabricated from any material demonstrating acceptable solvent resistance and mechanical durability; preferably, they are made from the same resin as is used to make the hollow fibers. Suitable hollow fiber-containing fabric-like arrays, including their construction, structure and performance, are taught, for example, in the following U.S. patents which are hereby incorporated by reference in their entirety: Kohl U.S. Pat. No. 3,557,962; Barer U.S. Pat. No. 4,460,641; Akasu U.S. Pat. No. 4,911,846; and Baurmeister U.S. Pat. No. 4,940,617; see also European Patent Application No. 0,093,677, published Nov. 9, 1983; and German Democratic Republic Patent Application No. 233,946, published Mar. 19, 1986.

According to preferred embodiments, a rod-shaped core is located at the longitudinal axis of the cartridge (if desired, this core can be temporarily placed at the axis, and removed following bundle fabrication). Although a solid rod can be used solely to provide structural support for the cartridge, hollow core mandrels are preferred. Core mandrels generally have a longitudinal axis and a cylindrical exterior surface, an axial bore, and perforations along the surface which communicate with the bore. Typical mandrels have cylindrical interior and exterior surfaces; however it is within the scope of the invention to employ mandrels having other surfaces, for example, mandrels having multi-sided geometric cross-sections (pentagonal, hexagonal, and the like), and mandrels whose bores contain internal axial flow dividers or core plugs which are installed or integrally formed in the mandrel. In this regard, the term "cylindrical" as used herein refers to the general shape of a hollow fiber membrane fabric after it has been spirally-wound onto a cylindrical mandrel or core (or itself). Were, for example, a mandrel of rectangular cross-section to be used (which use is within the contemplation of the invention), then the resulting spirally-wound bundle would tend initially to itself appear rectangular with rounded corners, in cross-section (as the spiral winding continues, such a bundle will gradually tend toward a cylindrical cross-section). The purpose of the perforations along the mandrel surface which communicate with the bore, is to facilitate fluid flow between the bundle and the mandrel bore along the mandrel's longitudinal axis. The mandrel perforations can take various shapes, such as round holes and elongated slits. In cases among the various embodiments of the invention in which it is desirable to control flow volumes of fluid out of or into the mandrel bore across its length, the mandrel perforations along the length of the bore can be sized and shaped accordingly. The perforations can also be confined to selected portions of the mandrel length to control flow volumes and paths (e.g., co-current or countercurrent). The overall length of the mandrel can also be adjusted to suit particular needs. The mandrel should be fabricated from a material demonstrating acceptable solvent resistance and mechanical durability. Preferably, the mandrel is made from a thermoplastic resin. More preferably, the mandrel is made from the same thermoplastic resin as is selected as the solvent resistant thermoplastic resin for potting the hollow fiber membrane fabric. Most preferably, the mandrel is made from a polyolefin resin. Solvent resistant metals can also be used. Suitable mandrels are disclosed in the following U.S. patents which are hereby incorporated by reference in their entirety: Kuzumoto U.S. Pat. No. 4,430,219; and Caskey U.S. Pat. No. 4,961,760.

The process steps discussed immediately below are carried out conventionally, and as such will only be briefly mentioned. Further information on them can be found, for example, in the following U.S. patents which are hereby incorporated by reference in their entirety: Caskey U.S. Pat. No. 4,961,760; and Bikson U.S. Pat. No. 5,026,479.

The fabric-like array is wound onto the mandrel surface (or itself, if no mandrel is used) to form a spirally-wound, cylindrically-shaped membrane bundle having two bundle ends communicating with the mandrel bore Assuming that the selected fabric consists of hollow fiber weft held together by solid warp filaments, then an end of the fabric is preferably aligned so that the hollow fibers are substantially parallel to the mandrel axis, the fabric end is attached to the mandrel (e.g. by clamping or adhesive), and the assembly is wound up into a cylinder. If, alternatively, a fabric having both weft and warp hollow fibers is used, then it may be desirable in certain applications to seal the warp fibers into communication with the mandrel perforations, and eliminate direct communication between the mandrel bore and the shell-side region. It is well known in the art that hollow fiber-containing fabric-like arrays can be wound helically onto a core surface, so that the hollow fibers proceed along a helical path with respect to the axis, with their two ends located at opposite ends of the core. This invention can readily be practiced with such arrays; it is also not strictly required (although preferred), that the hollow fibers are mutually parallel.

Next, still referring to the conventional technology, the two ends of the bundle are potted in resinous potting material serving to seal each of the bundle ends into a monolithic tube sheet. A variety of materials and several conventional methods for carrying out potting to form tube sheets are well known in the art, as shown, for example, in the Caskey U.S. Pat. No. 4,961,760 which is hereby incorporated herein by reference in its entirety. When the potting process is completed, a substantial portion of the bundle (between the two tube sheets) will be free from resinous potting material, and one or both of the potted ends of the bundle are then trimmed so that the lumen ends of each hollow fiber at the trimmed end(s) will be exposed.

Finally, the potted bundle is fitted into a suitable housing to constitute a module. Generally, the housing should have two open ends and a cylindrical interior, and be suitably shaped to contain the membrane bundle. After the bundle is installed in the housing, the tube sheet(s) adjacent to the bundle end(s) with exposed lumens is(are) sealed to the cylindrical interior of the housing, to positively prevent fluid flow between the shell side and the lumen side without passage through the membrane. At this point, the cartridge has been divided into two regions mutually communicating through the membrane including (1) a shell-side space which is exterior to the portion of the bundle between the tube sheets and is within the housing, and (2) a space including the hollow fiber lumens and the exposed bundle end(s). Next, end cap means suitably shaped to seal each of the two open housing ends are provided. These end caps, together with the housing interior and the bundle ends, serve to define two chambers, one or both of which communicate with the membrane lumens. To facilitate fluid introduction and recovery, suitable ports are provided for the housing. In embodiments where no mandrel is present, the housing must have at least one port communicating with the shell-side space, arranged to permit fluid injection and withdrawal therethrough. In embodiments including a mandrel, such ports are optional. In all embodiments of the invention, the housing must have at least one port communicating with the lumen side, arranged to permit fluid injection and withdrawal therethrough. Multiple ports can be provided, if desired. These considerations are further discussed in the prior art, including Caskey U.S. Pat. No. 4,961,760, which is hereby incorporated by reference in its entirety.

According to the invention, the tube sheets must be fabricated from a high-strength, solvent resistant thermoplastic resin, and the resin must be extruded at an elevated temperature to form a molten band of potting material that is directed onto the surface of the hollow fiber membrane fabric to be potted. The thermoplastic resin for use in accordance with the invention must exhibit the following properties.

Melt Flow Index. This is the single most important factor in choosing a thermoplastic resin for use. The thermoplastic must have a melt flow index ("MI") which is high enough so that the resin will flow during the potting process, and low enough so that it will (1) remain where it is deposited (not "run") and (2) not become brittle when it solidifies. The MI should broadly be between about 0.01 to about 150 grams/10 minutes, preferably about 0.1 to about 50 grams/10 minutes, more preferably about 1 to about 40 grams/10 minutes, and most preferably about 5 to about 20 grams/10 minutes (ASTM Method D1238-85; 2160 grams/10 minutes; all melt flow index values in this application are tested and expressed using this method and conditions; melt flow index should generally be measured according to ASTM Method D1238-85, or if not specified there, then at a temperature between about 50° to 70° C. above the sample's melting point). We note that resin viscosity is highly relevant to conventional gravity- and centrifugal-potting methods, because the ability of the resin to properly flow among the hollow fibers is crucial. In practicing the methods of the invention, however, melt flow index is the more appropriate measure of resin flow properties, because of the high viscosity of the resins which we employ. To illustrate the point, we consider polyethylene as an example. For polyethylene, a melt flow index of 150 roughly corresponds to a viscosity of 5,000,000 poise (at 190° C.; 1 poise=100 centipoise). A melt flow index of 0.01 for polyethylene, on the other hand, theoretically corresponds to a viscosity of roughly about 80,000,000,000 poise (at 190° C.), and cannot be easily measured—for that reason, such a viscosity is usually calculated by converting a melt flow index measurement into viscosity. (A melt flow index range of 5-20 for polyethylene corresponds to a viscosity range of roughly about 200,000,000 poise to about 40,000,000 poise (at 190° C.), again theoretically). The conversion of viscosity data into corresponding melt flow index is carried out by theoretical calculations as known by those skilled in the art. The estimated viscosity values for polyethylene reported here were calculated from measured melt flow index values according to Equation 2.3-19 on page 46 of *Transport Phenomena*, R. Bird et al, Wiley & Sons, New York; in combination with FIG. 2 of ATSM Method D1238-85, pp. 555-565. Similarly, elongation of the resin at break (expressed as a percentage of the pre-stretched length) and tensile- and flexural-modulus (normally expressed in megapascals, or "MPa") both decrease with increasing melt flow index. Both high elongation at break and modulus are desirable, and hence resins having a relatively low melt flow index are preferred.

Melting Point. Thermoplastic polymers can be either "crystalline" or amorphous. In general, no thermoplastic polymer is completely "crystalline": there is always an amorphous component. (The exception to this is single crystal polymers, which are laboratory curiosities prepared on a minute scale at high expense). On the other hand, an amorphous polymer can be completely amorphous. Which designation (crystalline or amorphous) is given to a particular polymer sample is simply a subjective judgement based on the relative influence of crystalline and amorphous components on the behavior of the sample. We explain this because it is the crystalline portions of a thermoplastic resin, if any, that have a true melting point temperature ($T_m$). The amorphous portions of crystalline and amorphous materials will gradually soften rather than melt. Hence, amorphous portions do not have a melting point. In order to permit selection of thermoplastic resins suitable for use in this invention, we need to establish objective tests. The melting points of crystalline components can be measured conventionally using a differential scanning calorimeter. One common expression of the softening phenomenon in amorphous polymers is the glass transition temperature ($T_g$), which is the temperature at which the amorphous material changes between glassy and rubbery states. The glass transition temperature can also be measured conventionally using a differential scanning calorimeter. In the case of a material having significant proportions of both crystalline and amorphous components (i.e., a "crystalline" polymer), both $T_g$ and $T_m$ can be measured. $T_m$ will be higher than $T_g$ and will tend to govern the overall behavior of the polymer sample in becoming sufficiently fluidized to enable its extrusion. In the case of a truly amorphous polymer, there will be no $T_m$, and $T_g$ will govern the polymer's behavior.

Another measure of both $T_g$ and $T_m$ is the Vicat Softening Temperature $(T_v)$, which is determined using ASTM Designation: D 1525 - 91 "Standard Test Method for Vicat Softening Temperature of Plastics". (See also, Whelan et al, *The Dynisco Extrusion Processors Handbook*, page 34 (1988). In the case of a crystalline polymer, $T_v$ corresponds to $T_m$. For an amorphous polymer, $T_v$ corresponds to $T_g$. In accordance with the above, $T_g$, $T_m$ and $T_v$ of a given polymer are measured as appropriate, and determination is made as explained directly below, as to whether the polymer can be used to practice the teachings of this invention. (Where not explicitly designated, "melting point" means $T_m$ in the case of a "crystalline" polymer; and means $T_g$ in the case of a truly amorphous polymer; "Vicat Softening Temperature" will be considered synonymous with $T_m$ and $T_g$ as explained above; it being understood that these values are analogous measures of the approximate point at which a resin at least begins to change from a solid to liquid state). In general, a thermoplastic resin for use according to the invention should melt at a temperature at least about 10° C. below the melting point of the chosen hollow fibers, more preferably at a temperature at least about 20° C. below the melting point of the chosen hollow fibers. Crystalline polypropylene melts at about 160° C.; hence, where crystalline polypropylene hollow fibers are used, a polyethylene resin melting at about 135° C. or less is preferred for potting the tube sheets (HDPE has a melting point of about 125° C. to about 135° C.; LLDPE has a melting point of about 115° C. to about 130° C.; and LDPE has a melting point of about 105° C. to about 115° C.).

Given the above requirements, any thermoplastic resin (1) otherwise having appropriate solvent resistance for the solvent environment in a particular desired end use application, and (2) having adequate capability of wetting the surface of the chosen hollow fibers (to result in a tube sheet without voids), can be employed as the potting resin. As non-limiting examples, the potting resin can be selected from homopolymers, copolymers, mixtures and blends of the following: polyolefins, polycarbonates, cellulosics, polysulfones, polyamides (including nylons), polyesters, flourine-plastics (including polytetrafluoroethylene), polyacrylates and polystyrenes. (Blends are a special type of mixture in which the components are mixed at a molecular level; mixtures can be less homogeneous, and may have more than one phase).

According to preferred embodiments, the thermoplastic potting resin is a polyolefin homopolymer, copolymer, blend or mixture. For example, the resin can be polyethylene, polypropylene poly-1-butene, polypentene, polyhexene, polymethylhexene, polyheptene, polymethylpentene, or crosslinkable polyethylene (in case of the latter, the resin is applied at a suitable temperature to catalyze the crosslinking reaction, resulting in enhanced solvent resistance and mechanical properties). Other olefin polymers, e.g., block and random copolymers of one or more olefins and non-olefins, as well as blends and mixtures of these polymers can also be used. In embodiments where such other olefin polymers are used, the essential nature of the overall resin is preferably that of a polyolefin—i.e., the polyolefin preferably constitutes at least about 50%, more preferably at least about 60% of the overall potting resin, and even more preferably, virtually 100% (by weight). As we have previously noted 100% olefin polymers are most preferred.

Crystallinity. Where a polyolefin potting resin is used, the resin preferably exhibits a crystallinity of at least about 30%. (Crystallinity is conventionally measured using differential scanning calorimetry "DSC"). The solvent resistance of polyolefins is directly proportional to their crystallinity. Accordingly, polyolefin polymers with high crystallinity are most preferred. Polyethylene by nature is crystalline, and the degree of crystallinity can be controlled by copolymerization of ethylene with higher ethylenically-unsaturated hydrocarbons. Depending on the polymerization catalyst and process employed, polypropylene is either "crystalline" (i.e., about 60% crystalline and about 40% amorphous by weight fraction) or amorphous (up to 100% amorphous, by weight fraction). In the case of polypropylene, crystalline polymer is normally acceptable; completely amorphous polypropylene is less preferred. However, due to its nonpolar nature, even completely amorphous polypropylene will demonstrate greater solvent resistance than polyurethane or epoxy adhesives in particular polar solvent environments. In the case of polyethylene, there are four primary types of crystalline polymer to consider: high density polyethylene ("HDPE", about 60% to about 80% crystalline); linear low density polyethylene ("LLDPE", about 40% to about 60% crystalline); low density polyethylene ("LDPE", about 30% crystalline); and very low density polyethylene ("VLDPE", less than about 30% to about 40% crystalline). All are acceptable, HDPE being most preferred. Even VLDPE is advantageous where the potted membranes will be exposed to polar solvents, because of its nonpolar nature. Crystallinity of these polyethylene polymers is proportional to the polymer density (degree of chain branching) in grams/liter. For example, HDPE has a density of about 0.941 to about 0.965 g/ml; LLDPE has a density of about 0.916 to about 0.940 g/ml; LDPE has a density of about 0.910 to about 0.925 g/ml; and VLDPE has a density of about 0.880 to about 0.910 g/ml. Although pure amorphous polymers are generally not preferred, they can be used if blended or mixed with partially-crystalline polymers; preferably the crystallinity (by weight fraction) of the overall blend or mixture is at least about 30%. Other olefin polymers, e.g., block and random copolymers of one or more olefins, can also be used, the crystallinity again preferably being maintained at 30% or higher.

Average Molecular Weight. Two commonly-accepted expressions of the average molecular weight of a polymer are "weight average molecular weight" and "number average molecular weight". We choose to use the former. Weight average molecular weight (expressed in grams/mole) is determined by calculating, for each molecular component of the polymer sample, the molar weight of the component in grams, and multiplying that molar weight by the mass of such component in the sample; then taking the sum of such calculations for each component; and finally, dividing the sum by the total mass of the sample. Empirically, weight average molecular weight can be determined by separating the components of the sample polymer from each other, finding the mass of each, and performing the above calculation. The separation can be done by (1) gel permeation chromatography (which functions by size exclusion of the components) or (2) dissolving the sample in a suitable solvent, distilling the solution, and collecting the components separately. The competing factors of (1) processability, which is optimized with a low molecular weight polymer, and (2) mechanical properties (including durability and resistance to cracking), which develop with entanglement of polymer molecules, are optimized with a high molecular weight polymer, should be balanced. Considering thermoplastics generally, reliance on the above guidelines for melt flow index will be adequate to select appropriate polymers for use as potting resins. According to preferred embodiments in which the potting resin is a polyolefin, entanglement (using polyethylene as an example) begins at a weight average molecular weight of about 1,250. More specifically, we have found that a weight average molecular weight of at least about 10,000 (where polyethylene resin is used) is preferred to ensure adequate mechanical properties. Broadly, the polyolefin resin will preferably have a weight average molecular weight between about 10,000 to about 500,000 grams/mole; and more preferably, it has a weight average molecular weight between about 20,000 to about 50,000 grams/mole. Ultra high molecular weight polyethylene, which generally has a weight average molecular weight of about 1,000,000 grams/mole or more (and is about 70–80% crystalline) can be used, but its extrusion requires very high pressure generally making its use less desirable.

For the remainder of this specification we will often refer specifically to polyolefin resins as the preferred materials for use as the potting resin. However, the invention is broadly applicable to thermoplastic resins having the above-defined required properties and optionally possessing the above-defined preferred properties.

The solvent resistant polyolefin resins selected for use according to preferred embodiments of the invention exhibit viscosities above about 50,000 centipoise (corresponding to a melt flow index of about 150), and consequently cannot be effectively used to pot the hollow fiber membrane fabric by gravity- or centrifugal-potting techniques. Hence, according to the invention, the preferred solvent resistant polyolefin resins are applied to the surface of the hollow fiber membrane fabric simultaneously while the hollow fiber membrane fabric is being wound to form a spirally-wound, cylindrically-shaped membrane bundle. More particularly, the fabric-like array is wound onto the mandrel surface (or itself, if no mandrel is used) to form a spirally-wound, cylindrically-shaped membrane bundle having two bundle ends communicating with the mandrel bore. As the hollow fiber membrane fabric is wound onto the mandrel surface, the fabric forms a nip with the surface. The solvent resistant polyolefin resin is extruded at an elevated temperature, yielding a molten band of resin of suitable width and thickness to make the tube sheet; and the molten band is continuously directed onto the surface of the hollow fiber membrane fabric. By "extrusion" is meant a process of forcibly driving the resin through a heated die, yielding a molten continuous stream of resin shaped in accordance with the chosen die. The temperature at which a given resin is extruded (i.e., as it exits the extruder die) is preferably about 50° to 70° C. above the polymer's melting point. This will ensure that the resin is sufficiently mobilized to flow, but not so fluidized that it will "run" (not stay where it is deposited). However, the temperature of the molten resin at the point of contact with the hollow fiber membrane fabric must also be carefully chosen to be at least about 10° C. below the temperature at which the chosen hollow fibers begin to melt or soften sufficiently to substantially deform or collapse the lumens, more preferably at a temperature at least about 20° C. below such temperature for the chosen hollow fibers. The point of contact temperature can be controlled by adjusting a variety of parameters in a manner that those of ordinary skill in the extrusion art will readily understand, including: the temperature of the various heating zones of the extruder, especially at the die orifice, the flow rate of the resin through the extruder, the take up distance between the die orifice and the point of contact (which allows the resin to cool), the speed of the advancing fabric, thickness of the band of molten resin, and the temperature and pressure applied by the compression roller (if employed). As the fabric is wound up onto the core (or mandrel), the relative speeds of travel of the core and extruder need to be adjusted: if the core is driven at a constant speed (in revolutions/minute), its circumference will steadily increase in speed. However, it is preferable to adjust the extruder speed (upward) instead of adjusting the core speed (downward), because (1) extruder speeds can be easily adjusted, and (2) maintaining the speed of motion of the molten resin in air constant (and high) will aid in maintaining the resin point-of-contact temperature. The result of this process is the application of solvent resistant resin lines at both bundle ends beginning at the unwound edge of the fabric facing and adjacent the nip with the axis, and proceeding along the fabric edge, forming continuous tube sheets at both bundle ends extending to the perimeter of the bundle. Preferably, the advancing molten band makes contact with the fabric in the vicinity of the nip. In one embodiment, the molten band makes contact with the side of the fabric which faces away from the nip; optionally in conjunction with this embodiment, a compressing roller meets with the molten band in the vicinity of the nip to press the molten band into the fabric. In another embodiment, the molten band makes contact with the side of the fabric which faces toward the nip: in this case, the nip itself presses the molten band into the fabric; optionally, a compressing roller can be added to apply additional pressure. This pressure should be regulated to ensure that the resin adequately flows through the fabric to eliminate all gaps and voids, but not so high that an inadequate amount of resin remains among the fibers to seal them into a monolithic tube sheet. The compressing rollers can be heated to a controlled temperature to maintain fluidity of the solvent resistant resin as needed; or they can be cooled to aid in heat dissipation and solidification of the resin. The solvent resistant resin need not be directly employed to fabricate a spirally-wound, cylindrically-shaped membrane bundle: following extrusion, the molten band of resin can be allowed to solidify, and subsequently can be re-heated by any suitable means restoring it to a molten state while retaining its desired shape, and then directed onto the fabric to produce a tube sheet.

In optional embodiments, the application of the molten band of resin is discontinued after all of the desired hollow fiber membrane fabric has been wound into the spirally-wound, cylindrically-shaped membrane bundle but before the thickness of the tube sheets (radius of the bundle measured from the longitudinal axis of the mandrel) is sufficient for the tube sheets to be sealed directly to the cylindrical housing interior. The tube sheets are then extended by appropriate application of further resin. For example, resin application is continued until the desired tube sheet diameter is achieved. Alternatively, molds of suitable size can be placed over the tube sheets of the potted bundle after all of the hollow fiber membrane fabric has been applied, and resin can be injected conventionally. If needed, the tube sheets can be machined down to precise needed dimensions for module installation. The tube sheets can then be sealed to the cylindrical housing interior as needed, by simply applying an appropriate amount of solvent resistant resin to the perimeters of the tube sheets. Alternatively, ring-shaped fittings of appropriate dimensions designed to tightly rest against the end of the cylindrical housing interior can be fabricated (e.g., injection molded), and adhesively attached to the perimeters of the tube sheets.

EXAMPLES

Tube Sheet Preparation

Polypropylene hollow fiber membrane fabric samples were potted according to the invention to form tube sheets, using each of the four commercially-available polyethylene resins listed below in Table 1. The apparatus is schematically illustrated in FIG. 1. Except in the cases of DOWLEX ® 2035 and Dow 12350N polyethylene resins. The polyolefin resin 10 was placed in a hopper 20 which fed the resin 10 into a Hakke one-inch single-screw extruder 30 (25:1 length/diameter; 2:1 compression) fitted with a four-inch ribbon die 40 (orifice thickness adjusted to 0.2 centimeters). In the cases of DOWLEX ® 2035 and Dow 12350N polyethylene resins, the same procedure was followed except that the extruder was a Hakke one-inch twin-screw extruder 30 (25:1 length/diameter; 2:1 compression) fitted with a four-inch ribbon die 40 (orifice thickness adjusted to 0.2 centimeters). The power supply for the extruder was a Hakke Rheocord 90 development torque rheometer (not shown) which was electrically wired to control the extruder screw speed and the temperatures in zones 1–5 of the extruder barrel. The Rheometer was set to control Zones 1 to 5 (the former being adjacent to the hopper, and the latter being at the die orifice) successively passes by the resin during extrusion, so that the desired resin temperature was reached at the die orifice. The resin 10 exited the extruder 30 through the ribbon die 40 having a rectangular orifice (not shown) having a set width of 10 centimeters and thickness adjusted to 0.2 centimeters, as a molten stream 50 of resin 10 moving in the direction of the arrow x. (In the FIG. three molten streams 50 are depicted. In the actual trials, only one ribbon die was used, and only one molten stream was produced, to pot one end of the fabric bundle. However, the addition of a second ribbon die to pot the other end of the bundle is shown for illustrative purposes. The third molten stream 50 between the other two, will be discussed later. (The ribbon die thickness was adjustable from 0.05 to 0.2 centimeters). The stream 50 of resin 10 was stretched down by gravity to a width of about one inch over the take up distance and directed to make contact with the hollow fiber membrane fabric 60 fed from fabric feed roll 70 and advancing in the direction of the arrow y at a point 80 near the nip 90 formed between the mandrel 100 and the fabric 60, whereupon it continued to move in the direction indicated by the arrow z. An optional compressing roller 110 (which was used with (and only with) all trials on the Dow 12350N resin and on the Dow 17350N resin, and there unheated) forced the stream 50 of resin 10 into the fabric 60. The mandrel 100 was advanced by a shaft driven by a variable-speed motor (not shown) to take up the advancing hollow fiber membrane fiber 60 potted with resin 10.

TABLE 1

| | | Polyethylene Resins | | | |
|---|---|---|---|---|---|
| Name | Resin Type | Density[1] | Melt Flow Index[2] | Melting Point[3] | Elongation at Break[4] |
| DOWLEX ® 2035 | LLDPE | 0.919 | 6.0 | 97[6] | 650 |
| HOSTALEN ®[7] GM 5010T2 | HDPE | 0.953 | 0.1 | 130 | N.A.[8] |
| HOSTALEN ® GC 7260 | HDPE | 0.957 | 8.0 | 128 | 800+ |
| Dow[9] 12350N | HDPE | 0.950 | 12.0 | 123[6] | 1,000 |
| Dow 17350N | HDPE | 0.950 | 17.0 | 123 | 900 |

[1]Grams per milliliter (g/ml).
[2]ASTM Method D1238-85; 190° C.; 2160 grams/10 minutes.
[3]Degrees Centigrade (°C.).
[4]Expressed as a percentage of the pre-stretched length.
[5]DOWLEX ® products are made by the Dow Chemical Company.
[6]Vicat Softening Temperature in degrees Centigrade (°C.), this data point only; determined in accordance with ASTM-D-1525.
[7]HOSTALEN is a registered trademark of Hoechst Aktiengesellschaft.
[8]Data not available.
[9]Available from the Dow Chemical Company.

The particular processing conditions which were employed with each resin sample, and the qualitative results, are summarized in Table 2. Additionally, in the Dow 12350N HDPE trial, the extruder screws were turning at 33 rpm; Zones 1–5 of the extruder barrel were set at 130° C., 155° C., 175° C., 175° C. and 175° C., respectively; the recorded polymer melt temperatures at Zones 3 and 5, respectively were 185° C. and 184° C.; and the pressure in the barrel at Zones 3 and 5, respectively was 118 pounds per square inch (psi) and 173 psi. In the Dow 2035 LLDPE trial, the extruder screws were turning at 44 rpm; Zones 1–5 of the extruder barrel were set at 325° Fahrenheit (F), 425.° F., 450° F., 460° F., and 460° F., respectively; the recorded polymer melt temperatures at Zones 4 and 5, respectively were 444° F. and 525° F.; and the pressure in the barrel at Zones 3 and 5, respectively was 59 pounds per square inch (psi) and 70 psi.

TABLE 2

| Name | Type | Extrusion Temperature[1] | Take Up Distance[2] | Results |
|---|---|---|---|---|
| DOWLEX ® 2035 | LLDPE | 238 | 1.0 | Good flow; sealed the fibers well. |
| HOSTALEN ® GM 5010T2 | HDPE | 260 | N.A.[3] | Very poor flow; viscosity too high; unusable. |
| HOSTALEN ® GC 7260 | HDPE | 190 | 0.5 | Good flow; temperature too high; fibers damaged. |
| Dow 12350N | HDPE | 175 | 0.5 | Good flow; sealed the fibers well. |
| Dow 17350N | HDPE | 160 | 0.5 | Good flow; sealed the fibers well; the low extrusion temperature is an advantage. |

[1]Die temperature (Zone 5) of extruder barrel in degrees Centigrade.
[2]Expressed in linear feet measured from the die orifice to the point of contact between the molten resin and the fabric.
[3]Unmeasurable.

DISCUSSION OF RESULTS

The DOWLEX ® 2035 LLDPE having a MI of 6 g/1 min flowed well and resulted in good sealing of the fabric. Although the extrusion temperature was very high, the take up distance was sufficient to cool the resin so that the hollow fibers were not damaged by the contact; and the resin's low melting point allowed it to remain molten despite the cooling.

The HOSTALEN ® GM 5010T2 HDPE demonstrated very poor flow due to its extremely low melt flow index and consequent high melt viscosity. Adhesion of the resin to the hollow fibers was very poor and the potting was unsuccessful.

The HOSTALEN ® GC 7260 HDPE flowed well at an extrusion temperature of 190° C. However, at this temperature and a take up distance of 0.5 feet, the molten polyethylene started to melt the hollow fibers on contact. Lowering the extrusion temperature or extending the take up distance resulted in resin flow inadequate to effectively pot the hollow fibers.

Figure 2:
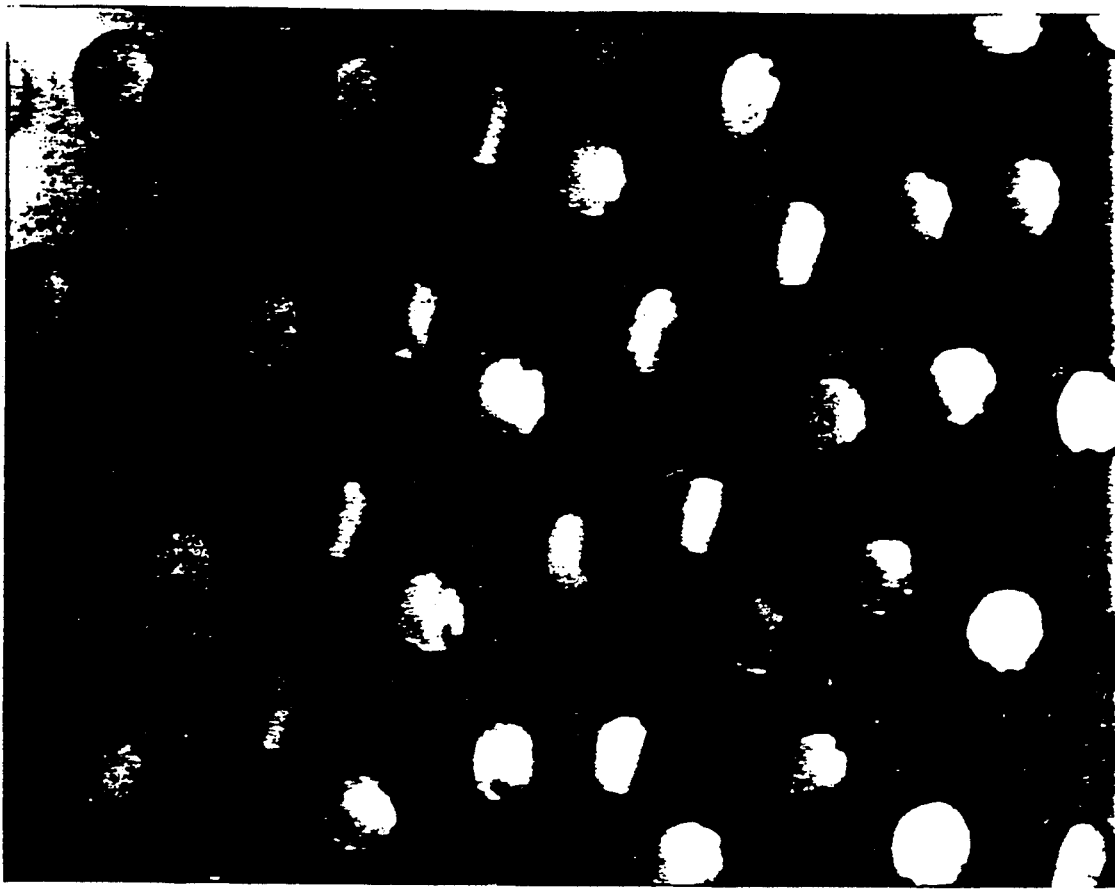
FIG. 2 is a cross sectional photograph of a tube sheet prepared according to the method of FIG. 1, magnified by a factor of twenty with an optical microscope.
Figure 3:
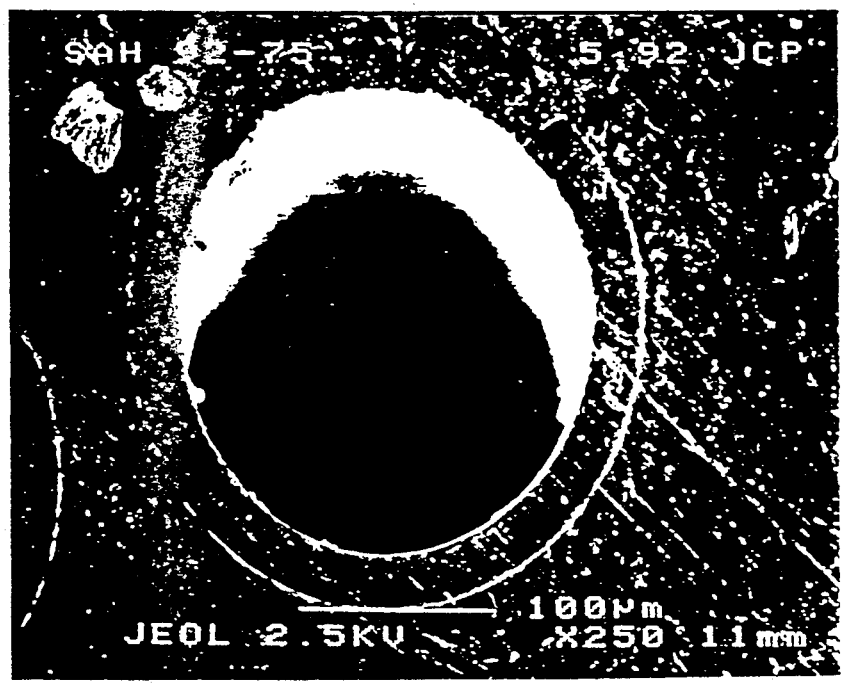
FIG. 3 is a cross sectional photograph of a tube sheet prepared according to the method of FIG. 1, magnified by a factor of 250 with a scanning electron microscope.

The Dow 12350N HDPE has a relatively high melt flow index (12.0 g/10 min.) compared with the other resins tested. This resin flowed very well at a relatively low extrusion temperature (175° C.). The resin completely filled the spaced between the hollow fibers and sealed all gaps. After complete curing, the tube sheet was cut to yield cross-sectional samples of the potted hollow fibers. FIGS. 2 and 3 respectively show optical microscope (magnification factor of 20), and scanning electron microscope (magnification factor of 250) cross-sectional views of hollow fibers in the tube sheet. Both of these FIGS. confirm that there are not gaps around the potted hollow fibers, and that the follow fibers remain cylindrical with unobstructed lumens.

SOLVENT RESISTANCE STUDIES

We know from data available in the literature ("HOSTALEN ® and HOSTALEN PP ®, Resistance to Chemicals and Other Media", Hoechst Plastics, May 1987; and "Chemical Resistance of Plastic Molding Materials", Dow Chemical Co., Plastics Dept., 1968) that the solvent resistance of high density polyethylene is equivalent to or better than that of polypropylene. As shown in Table 3 below, we would expect polyethylene to demonstrate equal performance (as compared with polypropylene) in methyl ethyl ketone, methyl isobutyl ketone and alcohol; better performance in amyl acetate, and slightly better performance in xylene.

TABLE 3

| Name | Testing Temperature | Solvent Resistance | | | | |
|---|---|---|---|---|---|---|
| | | MEK[1] | MIBK[2] | AmAc[3] | Alcohol | Xylene |
| PP[4] | 60° C. | L[5] | L | N[6] | R[7] | N |
| | 20° C. | R | R | R | R | N |
| HDPE | 60° C. | L | L | R | R | N |
| | 20° C. | R | R | R | R | L |

[1]methyl ethyl ketone.
[2]methyl isobutyl ketone.
[3]amyl acetate.
[4]polypropylene.
[5]resistant to a limited degree; swelling between 3-8 percent by volume.
[6]not resistant; swelling in excess of 8 percent by volume.
[7]resistant; swelling less than 3 percent by volume.

We carried out actual tests on the DOWLEX ® 2035 LLDPE, HOSTALEN ® GC 7260 HDPE, Dow 12350N HDPE and Dow 17350N HDPE with the same solvents to assess the solvent resistance of these resins. The tests were conducted by pouring resin pellets into aluminum weighing pans and heating the pellets in a convention oven for 30 minutes at 180° C. to produce disk-shaped resin samples. The disk-shaped sampled were then immersed in the various solvents for the time periods indicated in Table 4, and swelling was monitored by measuring the weight increase of the samples. The results are summarized in Table 4. The data show that the DOWLEX ® 2035 LLDPE had poor solvent resistance, especially at 40° C. All three of the HDPE samples tested, HOSTALEN ® GC 7260, Dow 12350N and Dow 17350N, demonstrated good solvent resistance overall, with limited resistance to xylene. Since HDPE yields much better results than LLDPE, these data confirm that high density (crystallinity) is important in providing good solvent resistance. Review of the melt flow indices of these resins shows that despite the lower melt flow index (higher molecular weight) of the DOWLEX ® 2035 LLDPE, the three HDPE samples gave better results. This indicates that high density is more important than low melt flow index (high molecular weight) in determining resin solvent resistance.

TABLE 4

| Name | Testing Temperature | Solvent Resistance Tests | | | | |
|---|---|---|---|---|---|---|
| | | Swelling[4] | | | | |
| | | MEK[1] | MIBK[2] | AmAc[3] | ETOH[5] | Xylene[6] |
| DOWLEX ® | 50° C. | 4.2 | 5.1 | 8.4 | 0.4 | 37 |

TABLE 4-continued

| | Solvent Resistance Tests | | | | | |
|---|---|---|---|---|---|---|
| | Testing | | | Swelling[4] | | |
| Name | Temperature | MEK[1] | MIBK[2] | AmAc[3] | ETOH[5] | Xylene[6] |
| 2035 | R.T.[7] | 1.0 | 1.2 | 2.1 | 0.2 | 17 |
| HOSTALEN ® | 50° C. | 1.0 | 0.9 | 1.5 | 0 | 7.1 |
| GC 7260 | R.T. | 0.3 | 0.3 | 0.6 | 0 | 3.5 |
| Dow | 50° C. | 0.9 | 1.0 | 1.5 | 0.0 | 8.8 |
| 12350N | R.T. | 0.6 | 0.2 | 0.4 | 0.0 | 4.0 |
| Dow | 50° C. | 0.8 | 0.9 | 1.6 | 0.0 | 8.3 |
| 17350N | R.T. | 0.2 | 0.1 | 0.4 | 0.0 | 3.1 |

[1]methyl ethyl ketone.
[2]methyl isobutyl ketone.
[3]amyl acetate.
[4]expressed as a percentage of the pre-testing volume, by weight. Data were taken after fourteen days of continuous sample immersion in the solvent.
[5]ETOH = 95% ethanol and 5% methanol (weight/weight).
[6]Specifically, meta-xylene.
[7]room temperature (about 25° C.).

In further optional embodiments, this invention can be combined with the teachings of copending U.S. Pat. application Ser. No.: 07/816,511 entitled, "Spiral-Wound Hollow Fiber Membrane Fabric Cartridges and Modules Having Flow-Directing Baffles", by simultaneously forming baffles in the bundle while potting the bundle in tube sheets. Only the portions of those teachings essential to an understanding of how to make such combinations are set forth here. More particularly, that application discloses the addition of at least one axially-symmetrical baffle (hereinafter "sealing means") formed within the shell-side region of the hollow fiber bundle in a shape which is rotationally symmetrical about the axis. These sealing means create radial cross-flow between the shell-side region and the hollow fiber lumens; the benefits of such radial cross-flow include: reduced channeling and development of boundary layers (tangential flow of fluid past the hollow fibers without membrane surface contact) and increased direct contact between fluids and membrane surfaces (and hence, greater phase contact and more efficient cartridge performance). The various process embodiments discussed above concerning application of the molten resin to form the tube sheets can also be applied to making the sealing means. As needs dictate, the solvent resistant resins used to form the sealing means and tube sheets can be the same or different; preferably, the same resin is used.

Figure 4:
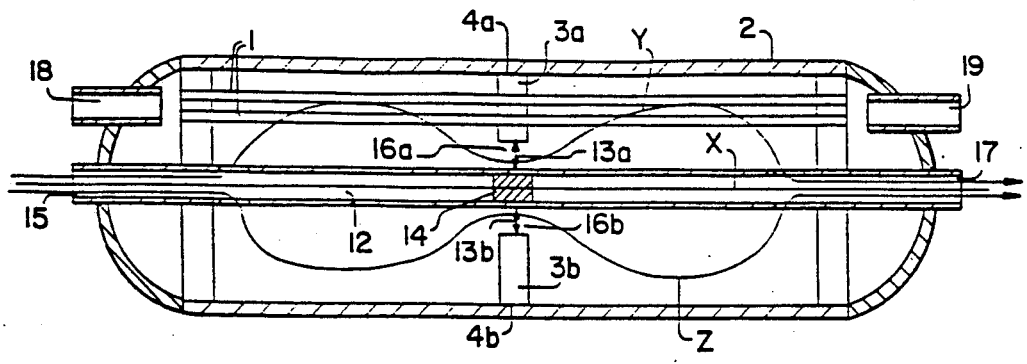
FIG. 4 is a schematic drawing of a cartridge made according to the method of FIG. 1, in which the tube sheets and a perimeter sealing means are simultaneously fabricated by extrusion of solvent resistant resin which is directly applied to the hollow fiber membrane fabric.

Referring to FIG. 4, a schematic drawing of a module is shown, in which hollow fiber fabric bundle (1) is contained in housing (2), surrounding mandrel (12). A single radially-symmetrical disc-shaped perimeter sealing means (3a, 3b) extends from the perimeter (4a, 4b) of the bundle (1) to a distance (13a, 13b) from the mandrel (12), and a core plug (14) is provided in the bore of the mandrel (12) at the point where the perimeter sealing means (3a, 3b) approaches the surface of the mandrel (12). As shown by the arrows (y, z), feed fluid enters the upstream mandrel port (15), is forced radially outward by the core plug (14) into the shell-side of the bundle (1), passes through the unobstructed axial sub-portion (16a, 16b) of the bundle (1), and exits through the downstream mandrel port (17). Since there is no blockage in the bore of the mandrel (12) downstream of the single core plug (14), the core plug (14) is preferably located near the downstream mandrel port (17) to minimize stagnant areas in the shell-side flow. Permeate is collected in the lumen-side and withdrawn at one or both off-center lumen ports (18, 19) at the ends of the bundle (1). Alternatively (not shown), feed can be introduced in the lumen-side at one of the off-center lumen ports (18, 19) at the ends of the bundle (1), and a sweep fluid can be introduced through the upstream mandrel port (15) or downstream mandrel port (17) to carry away permeate.

Shell-side fluid must be prevented from exterior channeling whenever a bundle includes one or more perimeter sealing means—i.e., flow along the outside perimeter of the bundle. This is accomplished by providing impermeable wrapping means covering the exterior cylindrical surface of the bundle. This can be either a coating or web-like impermeable layer or equivalent means affixed to the exterior cylindrical surface of the bundle. When such a wrapping means is present, perimeter sealing means are placed in sealing engagement with the impermeable wrapping means. In embodiments where no mandrel is present, an opening must be provided in the impermeable wrapping means to allow at least one port ("shell-side access means") communicating with the shell-side space, to be placed on the side of the bundle. The edges of the impermeable wrapping means surrounding the shell-side access means should be sealed to the shell-side access means to prevent leakage from the shell-side space.

In many cases it will be desirable to provide a hollow mandrel, as discussed above, to serve as the core for the module. In such cases, the feed fluid can be directed into the center of the bundle through the mandrel, instead of being directed into a side of the housing (the latter of which detracts from radial flow, because the flow enters the bundle only on one side). In such cases, it is necessary to supplement the radially-symmetrical sealing means with one or more core plugs which may be installed or integrally formed in the mandrel, to prevent the feed from simply flowing straight through the mandrel bore without entering the bundle. Core plugs in general are known in the art, as shown in the following U.S. patents which are hereby incorporated by reference in their entirety: Schell U.S. Pat. No. 3,872,014; Foreman U.S. Pat. No. 4,033,878; Caskey U.S. Pat. No. 4,961,760; Herczeg U.S. Pat. No. 4,997,564; and Reddy U.S. Pat. No. 5,034,126.

Fabrication of the module schematically shown in FIG. 4 proceeds as described above (the mandrel serving as the axis), the tube sheets being formed simultaneously as the fabric is wound until the fabric has been wound up to the predetermined distance from its axis. As schematically shown in FIG. 1 as the central molten stream 50 of resin 10 (between the other two molten streams), an additional molten band of solvent resistant resin (which is preferably the same resin as is used to produce the tube sheets, is then continuously applied along with the continuing application of resin to form the tube sheets, beginning at the unwound edge of the fabric facing and adjacent the nip with the wound portion, and preferably at the midway point between the two bundle ends, and proceeding in a line perpendicular to the axis (x), forming a continuous seal extending to the perimeter of the bundle. This seal has a planar disc-like monolithic shape.

Figure 5:
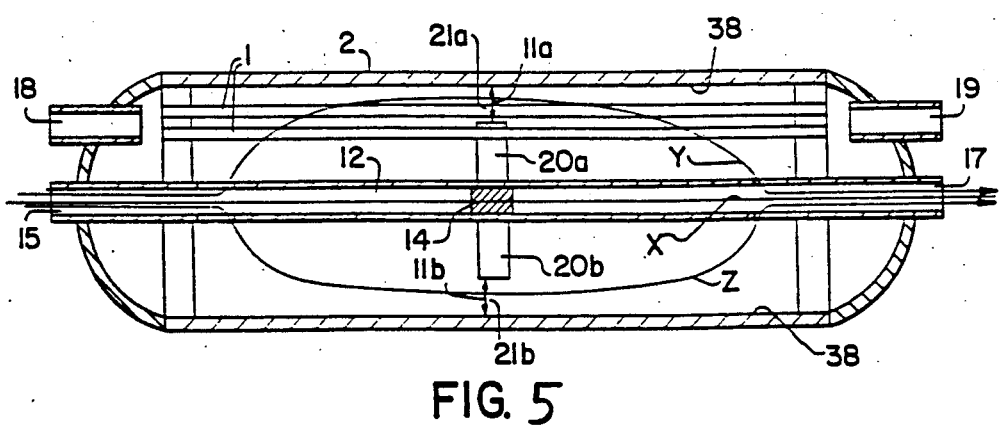
FIG. 5 is a schematic drawing of a cartridge made according to the method of FIG. 1, in which the tube sheets and an axial sealing means are simultaneously fabricated by extrusion of solvent resistant resin which is directly applied to the hollow fiber membrane fabric.

FIG. 5 schematically illustrates a module in which hollow fiber fabric bundle (1) is contained in housing (2), surrounding mandrel (12). A single radially-symmetrical disc-shaped axial sealing means (20a, 20b) extends from the surface of the mandrel (12) to a distance (11a, 11b) from the cylindrical housing interior (38), and a core plug (14) is provided in the bore of the mandrel (12) at the point where the axial sealing means meets the surface of the mandrel (12). As shown by the arrows (y, z), feed fluid enters the upstream mandrel port (15), is forced radially outward by the core plug (14) and axial sealing means (20a, 20b) into the shell-side of the bundle (1), passes through the unobstructed perimeter sub-portion (21a, 21b) of the bundle (1), and exits through the downstream mandrel port (17). Again, since there is no blockage in the bore of the mandrel (12) downstream of the single core plug (14), the core plug (14) is preferably located near the downstream mandrel port (17) to minimize stagnant areas in the shell-side flow. Permeate is collected in the lumen-side and withdrawn through the off-center lumen ports (18, 19) at one or both ends of the bundle (1). Alternatively (not shown), feed can be introduced in the lumen-side at one of the off-center lumen ports (18, 19) at the ends of the bundle (1), and a sweep fluid can be introduced through the upstream mandrel port (15) or downstream mandrel port (17) to carry away permeate. As schematically shown in FIG. 1 as the central molten stream 50 of resin 10 (between the other two molten streams), the axial sealing means (20a, 20b) is constructed by continuously directing a molten band of solvent resistant resin onto the hollow fiber membrane fabric (simultaneously with the application of resin to form the tube sheets), beginning at the module axis and proceeding in a direction perpendicular to the axis outward along the unwound edge of the fabric facing and adjacent the advancing nip with the wound portion, until the desired distance from the cylindrical housing interior (38) is reached.

Figure 6:
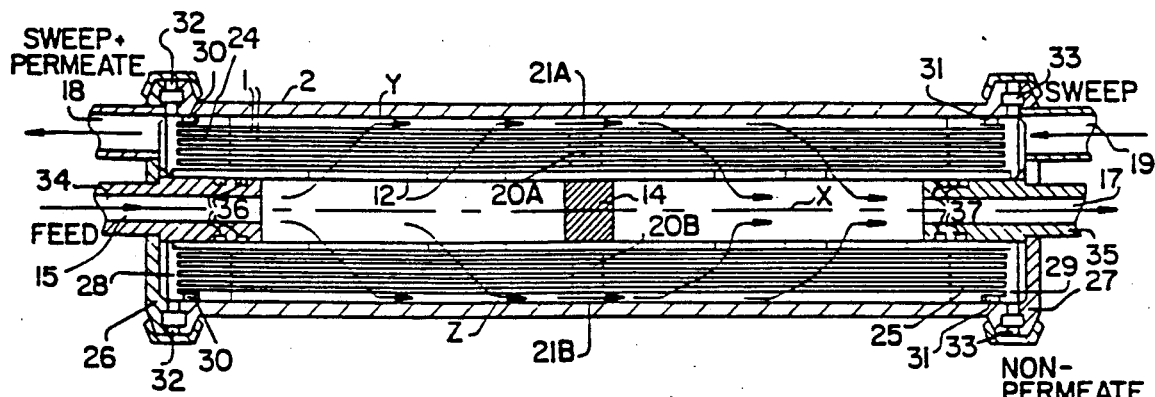
FIG. 6 is a cross-sectional drawing of a module according to FIG. 5.

FIG. 6 is a cross-sectional drawing of a module according to FIG. 5. This drawing shows a plurality of hollow fibers in the bundle (1), drawn much larger than scale. The bundle (1) surrounds a mandrel (12) centered on the axis (x), and is contained by a housing (2). At the midpoint of the mandrel (12) is a core plug (14), and adjacent thereto, an axial sealing means (20a, 20b). The bundle (1) is potted at both ends in tube sheets (24, 25). End caps (26, 27) are fitted over the tube sheets (24, 25) forming chambers (28, 29). The housing (2) is fitted at both ends with o-rings (30, 31) in sealing engagement with the tube sheets (24, 25); and o-rings (32, 33) in sealing engagement with the end caps (26, 27). The mandrel (12) is fitted at both ends with tubes (34, 35) which are each fitted with two o-rings (36, 37) in sealing engagement with the bore of the mandrel (12) which respectively serve to guide feed fluid from the upstream mandrel port (15) into the mandrel (12), and from the mandrel (12) to the downstream mandrel port (17). As shown by the arrows (y, z), feed fluid enters the mandrel (12) through the upstream mandrel port (15), and is forced radially through the shell-side of the bundle (1) by the core plug (14) and axial sealing means (20a, 20b). The fluid flows through the unobstructed perimeter sub-portion (21a, 21b) of the bundle (1), and flows inwardly toward the mandrel (12) to exit as concentrate through the downstream mandrel port (17). Permeate is collected at the lumen-side port (18). A second lumen port (19) has been added at the downstream end of the bundle (1). This modification makes it possible to introduce a sweep fluid at one of the lumen ports (18) and (19), and to withdraw it, together with feed fluid components that have permeated from the shell-side space through the membrane, at the other one of the lumen ports.

Attention should be paid to the width and thickness of the molten bands of solvent resistant resin applied to produce the tube sheets and sealing means, respectively. Concerning the tube sheets, the width of the band as applied to the hollow fiber membrane fabric is dictated by a balance of the competing goals to (1) provide adequate adhesive force to prevent failure of the tube sheets (the tube sheets must withstand the full operating pressure of the cartridge), and (2) maximize the hollow fiber surface area which is exposed to shell side fluid contact, and minimize the distance between successive layers of hollow fiber membrane fabric in the cartridge (thereby further maximizing the hollow fiber surface area in the cartridge). Further, the thickness of the band should be adjusted to both (1) provide enough volume of resin to completely coat the portion of the hollow fibers to be potted, while again (2) maximizing the hollow fiber surface area which is exposed to shell side fluid contact. Preferably, an adjustable ribbon die is used to extrude the resin. For example, a ribbon die having an adjustable thickness of 0.05–0.2 centimeters and a width of 4 inches can be used. The ribbon die dimensions and take up distance are then empirically adjusted to result, after stretching of the resin over the take up distance and according reduction in its width and thickness, in a resin band of appropriate thickness which will result in the formation of a tube sheet of desired width. Typically, tube sheets having a width of about one to one-and-one-half inches are preferred on bundles having a diameter up 7 to about 4 inches; bundles having larger diameters generally require tube sheets of proportionately greater width.

Generally, the width of the axial- and perimeter-sealing means can be more narrow than that of the tube sheets, because (1) it is desirable to minimize the shell-side space consumed by the sealing means and attendant reduction in the module's mass transfer efficiency, and (2) the sealing means need not withstand the full operating pressure. In additional embodiments, one or more of each of the above two types of sealing means are employed together. Although the discussion above has been directed to sealing means in planar disc form oriented perpendicular to the module axis, sealing means having other shapes which are axially-symmetrical and rotationally symmetrical about the axis may be provided where desired.

The extrusion dies to be employed can be chosen on a case by case basis, as dictated by the needed shape, size and number of molten resin bands. Where a cartridge having tube sheets at both ends is to be made, a die having two orifices appropriately spaced and positioned is preferably used. If one or more sealing means are to be fabricated in the bundle, appropriate further die orifices can be added, together with means to open and close the orifices as needed to make the sealing means. Such opening and closing means can be automatically controlled. In preferred embodiments, dies that will produce ribbon-shaped bands of molten resin (ribbon dies) are employed: whereas the width of the bands must be sufficient to withstand operating pressures, the relative thickness of the deposited resin should be consistent with the thickness of the fabric.

In a particularly preferred embodiment of the invention, the components of the cartridge (hollow fiber membrane fabric and solvent resistant resin) are all polyolefin materials. In this manner, the materials constituting the hollow fiber membrane fabric and solvent resistant resin can be matched in terms of solvent resistance to specific classes of solvents. Hence, the overall nonpolarity of the cartridge, its resistance to polar solvents, and predictability of the cartridge's performance in particular application environments can be simultaneously maximized.

Whereas the cartridge components are fabricated from polymeric materials in part due to processability requirements, the other components making up a module can be chosen from a wide range of materials which have even greater solvent resistance and mechanical durability. However, in particular applications, fabrication of some or all module components from polyolefin materials may also be desirable.

The spiral-type hollow fiber membrane fabric-containing cartridges and modules of the invention are generally operated in a manner similar to conventional cartridges and modules. Accordingly, suitable operating procedures are disclosed in the following U.S. patents which are hereby incorporated by reference in their entirety: Banner U.S. Pat. No. 4,758,341; Holland U.S. Pat. No. 4,855,058; and Caskey U.S. Pat. No. 4,961,760. More particularly, a fluid can be introduced into the bundle lumens at either or both potted ends, and allowed to diffuse out of the fibers into the shell-side region. The permeated fluid can then be collected at either the mandrel (through the perforations) or at the cartridge perimeter, or both. Alternatively, a fluid can be introduced at one or both ends of the mandrel through the bore and allowed to diffuse through the mandrel perforations into the shell-side region. Fluid which permeates through the fibers into their lumens can then be collected at one or both of the potted bundle ends; and concentrate remaining in the shell-side region can be collected at the cartridge perimeter. Ports to facilitate these permutations can be built into the module housing at the bundle ends and on the cylindrical exterior of the housing as needed.

End use applications for the spiral-type hollow fiber membrane fabric-containing cartridges and modules of the invention include the end uses for conventional cartridges and modules as disclosed in the art. For example, the end uses disclosed in the following U.S. patents, which are hereby incorporated by reference in their entirety, are contemplated: Holland U.S. Pat. No. 4,855,058; Baurmeister U.S. Pat. No. 4,940,617; and Caskey U.S. Pat. No. 4,961,760. In general, gaseous fluids will flow more evenly and freely through the bundle than liquids, whose resistance to free flow increases with viscosity.

While several embodiments of the invention have been illustrated and described above, it is not intended to be limited to the details shown, since various modifications and structural changes may be made without departing from the spirit of the present invention, which is defined by the claims below.

We claim:

1. A method of fabricating a spiral-type hollow fiber membrane fabric-containing cartridge including tube sheets having improved solvent resistance and mechanical durability, comprising the following steps:
   a. forming a plurality of hollow fiber membranes each having a lumen, into a fabric-like array having a warp and a weft, in which the hollow fibers substantially are mutually-parallel and constitute the fabric weft, and are held in spaced-apart relationship by filaments constituting the fabric warp; then
   b. winding the array upon an axis which is substantially parallel to the hollow fibers into a spirally-Wound membrane bundle having two bundle ends and a cylindrical exterior surface; and
   c. simultaneously with step (b.), extruding in molten form a high-strength, solvent resistant thermoplastic resin having a melting point at least about 10° Centigrade below the melting point of the hollow fibers, and having a melt flow index between about 0.01 to about 150 grams/10 minutes; and directing said resin onto each of the two bundle ends to thereby pot each of the two bundle ends in said resin, serving to seal the bundle end into an adjacent monolithic tube sheet, a portion of the bundle between the two tube sheets being free from resin to form a shell-side region; and then
   d. exposing the lumen ends of the hollow fibers constituting at least a first one of the bundle ends to communicate with the exterior of the bundle.

2. The method of claim 1, in which the high-strength, solvent resistant thermoplastic resin has a melting point at least about 20° Centigrade below the melting point of the hollow fibers.

3. The method of claim 1, in which the high-strength, solvent resistant thermoplastic resin has a melt flow index between about 0.1 to about 50 grams/10 minutes 4. The method of claim 1, in which the high-strength, solvent resistant thermoplastic resin has a melt flow index between about 1 to about 40 grams/10 minutes.

5. The method of claim 1, in which the high-strength, solvent resistant thermoplastic resin has a melt flow index between about 5 to about 20 grams/10 minutes.

6. The method of claim 1, in which the axis is constituted by a hollow mandrel having a longitudinal axis and a cylindrical exterior surface, an axial bore, and perforations along the surface which communicate with the bore.

7. The method of claim 1, in which the lumen ends of the hollow fibers constituting both of the bundle ends are exposed to communicate with the exterior of the bundle.

8. The method of claim 1, comprising further steps as follows:
   e. subsequent to step (b), covering the cylindrical exterior surface of the bundle with an impermeable wrapping means; and
   f. simultaneously with step (b), forming at least one axially-symmetrical sealing means from high-strength, solvent resistant thermoplastic resin within the shell-side region in a shape which is rotationally symmetrical about the axis, said sealing means being in sealing engagement with the impermeable wrapping means and extending to a distance away from the axis, forming an axial sub-portion of the shell-side region which is unobstructed to fluid flow, said sealing means dividing the shell-side region into two shell-side portions in mutual fluid communication through the sub-portion.

9. The method of claim 1, comprising further steps as follows:
   e. simultaneously with step (b), forming at least one axially-symmetrical sealing means from high-strength, solvent resistant thermoplastic resin within the shell-side region in a shape which is rotationally symmetrical about the axis, said sealing means intersecting the axis and extending to a perimeter which is located at a distance away from the cylindrical housing interior, forming a sub-portion of the shell-side region between the cylindrical interior of the housing and the perimeter of the sealing means which is unobstructed to fluid flow, said sealing means dividing the shell-side region into two shell-side portions in mutual fluid communication through the sub-portion.

10. The method of claim 1, in which the high-strength, solvent resistant thermoplastic resin is a polyolefin homopolymer, copolymer, blend or mixture comprising one or more members of the group consisting of polyethylene, polypropylene, poly-1-butene, polypentene, polyhexene, polymethylhexene, polyheptene and polymethylpentene having: a crystallinity of at least about 30%; and a weight average molecular weight between about 10,000 and about 500,000 grams per mole.

11. The method of claim 10 in which the high-strength, solvent resistant thermoplastic resin is a high density polyethylene homopolymer having a crystallinity of about 60% to about 80%.

12. The method of claim 10 in which the high-strength, solvent resistant thermoplastic resin has a weight average molecular weight between about 20,000 to about 50,000 grams/mole.

13. The method of claim 1, in which the hollow fibers are made from a high-strength, solvent resistant thermoplastic resin which is a polyolefin homopolymer, copolymer, blend or mixture comprising one or more members of the group consisting of polyethylene, polypropylene, poly-1-butene, polypentene, polyhexene, polymethylhexene, polyheptene and polymethylpentene.

14. The method of claim 13, in which the hollow fibers are made from a polypropylene homopolymer having a melting point of about 160° Centigrade, and the high-strength, solvent resistant thermoplastic resin is a polyethylene homopolymer having a melting point of about 135° Centigrade or less.

15. A spiral-type hollow fiber membrane fabric-containing cartridge including tube sheets having improved solvent resistance and mechanical durability, fabricated by the method of claim 1, 6, 7, 8, 9, 10, 11, 13 or 14.

16. A method of fabricating a spiral-type hollow fiber membrane fabric-containing module including tube sheets having improved solvent resistance and mechanical durability, comprising the following steps:

a. forming a plurality of hollow fiber membranes each having a lumen, into a fabric-like array having a warp and a weft, in which the hollow fibers substantially are mutually-parallel and constitute the fabric weft, and are held in spaced-apart relationship by filaments constituting the fabric warp; then b. winding the array upon an axis which is substantially parallel to the hollow fibers into a spirally-wound membrane bundle having two bundle ends and a cylindrical exterior surface; and c. simultaneously with step (b), extruding in molten form a high-strength, solvent resistant thermoplastic resin having a melting point at least about 10° Centigrade below the melting point of the hollow fibers, and having a melt flow index between about 0.01 to about 150 grams/10 minutes; and directing said resin onto each of the two bundle ends to thereby pot each of the two bundle ends in said resin, serving to seal the bundle end into an adjacent monolithic tube sheet, a portion of the bundle between the two tube sheets being free from resin to form a shell-side region; then d. exposing the lumen ends of the hollow fibers constituting at least a first one of the bundle ends to communicate with the exterior of the bundle; then e. inserting the bundle into a housing for the bundle having first and second housing ends and a cylindrical housing interior and being suitably shaped to contain the membrane bundle, having means adjacent the first housing end sealing the tube sheet adjacent the first bundle end to the cylindrical housing interior, said housing which contains the bundle defining two regions mutually communicating through the membrane including (1) a shell-side space exterior to the portion of the bundle between the tube sheets and within the housing, and (2) a space including the hollow fiber lumens and the first bundle end; then f. applying first end cap means adjacent the first housing end and suitably shaped, together with the cylindrical housing interior and the first bundle end, to seal the first housing end and define a first chamber communicating with the membrane lumens; and g. applying second end cap means adjacent the second housing end and suitably shaped, together with the cylindrical housing interior and the second bundle end, to seal the second housing end and define a second chamber; and h. providing shell-side access means in the housing, including at least one port communicating with the shell-side space, arranged to permit fluid injection and withdrawal therethrough; and i. providing at least one port communicating with the first chamber in the housing, arranged to permit fluid injection and withdrawal therethrough.

17. A spiral-type hollow fiber membrane fabric-containing module including tube sheets having improved solvent resistance and mechanical durability, fabricated by the method of claim 16.

* * * * *